United States Patent
Asai (10) Patent No.: US 11,683,433 B1
(45) Date of Patent: Jun. 20, 2023

(54) IMAGE READING APPARATUS

(71) Applicant: TOSHIBA TEC KABUSHIKI KAISHA, Tokyo (JP)

(72) Inventor: Shota Asai, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/899,780

(22) Filed: Aug. 31, 2022

(51) Int. Cl.
  *H04N 1/10* (2006.01)
  *H04N 1/00* (2006.01)
  *H04N 1/04* (2006.01)

(52) U.S. Cl.
  CPC ......... *H04N 1/1039* (2013.01); *H04N 1/0449* (2013.01); *H04N 1/103* (2013.01);
  (Continued)

(58) Field of Classification Search
  CPC ............... H04N 1/193; H04N 1/02815; H04N 2201/0081; H04N 1/1017; H04N 1/1013;
  (Continued)

(56) References Cited

U.S. PATENT DOCUMENTS

| | | | | |
|---|---|---|---|---|
| 7,733,538 B2 * | 6/2010 | Kanesaka | ............ | H04N 1/1026 358/475 |
| 2005/0063871 A1 * | 3/2005 | Kubota | ................ | G01N 21/255 422/82.05 |

(Continued)

FOREIGN PATENT DOCUMENTS

| JP | 3-270370 | 12/1991 |
|---|---|---|
| JP | 11-55475 | 2/1999 |
| JP | 2001-169048 | 6/2001 |

*Primary Examiner* — Negussie Worku
(74) *Attorney, Agent, or Firm* — Amin, Turocy & Watson, LLP (57) ABSTRACT

According to one embodiment, an image reading apparatus includes a light emitting unit, a first carriage, a first photoelectric conversion unit, a first lens, and a second carriage. The light emitting unit irradiates a reading object with light. The first carriage includes a first optical member for guiding reflected light from the reading object. The first carriage is movable in a sub-scanning direction along the reading object. The first photoelectric conversion unit receives the reflected light from the reading object guided through the first optical member and outputs an image signal. The first lens is disposed on an optical path of the reflected light between the first optical member and the first photoelectric conversion unit, and images the reflected light from the reading object on the first photoelectric conversion unit. The second carriage is movable in a main scanning direction orthogonal to the sub-scanning direction along the reading object with respect to the first carriage. The second carriage includes a second optical member for guiding the reflected light from the reading object, a second photoelectric conversion unit that receives the reflected light from the reading object guided through the second optical member to output an image signal, and a second lens that is disposed on an optical path of the reflected light between the second optical member and the second photoelectric conversion unit and images the reflected light from the reading object on the second photoelectric conversion unit at a magnification different from the first lens.

20 Claims, 5 Drawing Sheets

(52) U.S. Cl.
CPC . *H04N 1/00241* (2013.01); *H04N 2201/0049* (2013.01); *H04N 2201/0081* (2013.01); *H04N 2201/0442* (2013.01); *H04N 2201/0458* (2013.01)

(58) Field of Classification Search
CPC ....... H04N 2201/0094; H04N 1/02865; H04N 1/12; H04N 1/02855; H04N 1/1911; H04N 1/0473; H04N 1/00795; H04N 1/40056; H04N 1/02835; H04N 2201/0082; H04N 1/00602; H04N 1/0285; H04N 1/00037; H04N 1/04; H04N 2201/04794; H04N 1/401; H04N 1/00013; H04N 1/00681; H04N 1/1026; H04N 2201/04755; H04N 1/02895; H04N 1/00045; H04N 1/00588; H04N 1/1135; H04N 1/00559; H04N 1/2032; H04N 1/00002; H04N 1/121; H04N 2201/044; H04N 1/00737; H04N 2201/04744; H04N 1/00708; H04N 2201/04791; H04N 1/00063; H04N 1/047; H04N 1/103; H04N 1/00822; H04N 2201/02439; H04N 2201/0468; H04N 2201/04712; H04N 1/02885; H04N 1/203; H04N 2201/02485; H04N 1/00087; H04N 1/00; H04N 1/00519; H04N 2201/0091; H04N 2201/04731; H04N 1/00034; H04N 1/00694; H04N 1/00713; H04N 2201/04734; H04N 2201/04762; H04N 1/0057; H04N 2201/04732; H04N 1/00411; H04N 1/0071; H04N 1/32561; H04N 2201/02462; H04N 2201/0471; H04N 1/00734; H04N 1/00814; H04N 1/0443; H04N 2201/0446; H04N 2201/04729; H04N 2201/04789; H04N 1/00005; H04N 1/00572; H04N 1/00702; H04N 1/00798; H04N 1/10; H04N 1/00082; H04N 1/00912; H04N 1/053; H04N 1/1056; H04N 1/32502; H04N 1/32545; H04N 1/00551; H04N 1/00557; H04N 1/00811; H04N 1/03; H04N 1/32523; H04N 1/486; H04N 1/0083; H04N 1/0402; H04N 2201/02468; H04N 1/00031; H04N 1/0005; H04N 1/00755; H04N 1/0289; H04N 1/0414; H04N 1/0464; H04N 1/00745; H04N 1/00915; H04N 1/0305; H04N 1/32; H04N 1/4076; H04N 2201/0422; H04N 1/00687; H04N 1/00689; H04N 1/00806; H04N 1/02845; H04N 2201/0442; H04N 2201/0456; H04N 2201/04756; H04N 1/00068; H04N 1/00591; H04N 1/0075; H04N 1/0287; H04N 1/1043; H04N 1/128; H04N 2201/02435; H04N 2201/3288; H04N 1/00023; H04N 1/00127; H04N 1/0062; H04N 1/1061; H04N 1/4005; H04N 2201/02495; H04N 2201/04703; H04N 2201/04786; H04N 1/00018; H04N 1/00254; H04N 1/00631; H04N 1/00748; H04N 1/00989; H04N 1/028; H04N 1/0288; H04N 1/00076; H04N 1/00578; H04N 1/00779; H04N 1/00909; H04N 1/1215; H04N 1/393; H04N 2201/0241; H04N 2201/04749; H04N 1/00641; H04N 1/00885; H04N 1/32358; H04N 1/56; H04N 1/6027; H04N 2201/02445; H04N 1/00092; H04N 1/00692; H04N 1/00774; H04N 1/00816; H04N 1/0455; H04N 1/1039; H04N 1/207; H04N 1/32609; H04N 1/387; H04N 2201/02425; H04N 2201/0458; H04N 1/00053; H04N 1/0009; H04N 1/00204; H04N 1/00538; H04N 1/00896; H04N 1/00954; H04N 1/0281; H04N 1/32529; H04N 2201/02416; H04N 2201/04767; H04N 1/00015; H04N 1/00413; H04N 1/00525; H04N 1/00718; H04N 1/00771; H04N 1/00846; H04N 1/0087; H04N 1/00933; H04N 1/32443; H04N 1/32512; H04N 1/409; H04N 1/00323; H04N 1/00567; H04N 1/00633; H04N 1/00976; H04N 1/0284; H04N 1/0303; H04N 1/125; H04N 1/192; H04N 1/32128; H04N 1/32507; H04N 1/32555; H04N 2201/0039; H04N 2201/02402; H04N 2201/0416; H04N 2201/0418; H04N 1/0061; H04N 1/00716; H04N 1/0074; H04N 1/00742; H04N 1/00761; H04N 1/00819; H04N 1/0249; H04N 1/0411; H04N 1/0461; H04N 1/1225; H04N 1/32133; H04N 1/32598; H04N 1/40012; H04N 1/40037; H04N 1/4095; H04N 1/4097; H04N 1/6086; H04N 2201/0006; H04N 2201/0041; H04N 2201/02412; H04N 2201/0472; H04N 2201/327; H04N 2201/3271; H04N 23/11; H04N 25/75
USPC .......................................................... 358/497
See application file for complete search history.

(56) References Cited

U.S. PATENT DOCUMENTS

| | | | | |
|---|---|---|---|---|
| 2005/0206978 | A1* | 9/2005 | Sone | H04N 1/486 358/1.9 |
| 2008/0316548 | A1* | 12/2008 | Yamauchi | H04N 1/02895 358/475 |
| 2010/0214803 | A1* | 8/2010 | Sakamoto | G02B 6/0038 362/612 |
| 2011/0013235 | A1* | 1/2011 | Takahashi | H04N 1/02865 358/475 |
| 2011/0096373 | A1* | 4/2011 | Mikuni | H04N 1/00559 358/474 |
| 2015/0288842 | A1* | 10/2015 | Enomoto | H04N 1/00989 358/474 |
| 2016/0065768 | A1* | 3/2016 | Yamasaki | H04N 1/00798 358/474 |

\* cited by examiner

IMAGE READING APPARATUS

FIELD

Embodiments described herein relate generally to an image reading apparatus.

BACKGROUND

Examples of an image reading apparatus include a scanner installed in a work place or the like. The scanner applies light to a reading object, photoelectrically converts the reflected light, and outputs image data. The scanner has a function of reading an image of the reading object at a higher resolution than usual.

In this scanner, in order to read the image of the reading object at a higher resolution than usual, a lens unit that receives reflected light from the reading object is replaced with a lens unit with a high resolution. In this case, it is necessary to replace the lens unit in the case of reading an image at a normal resolution and reading an image at a high resolution, and it is not convenient.

DETAILED DESCRIPTION

In general, according to one embodiment, an image reading apparatus includes a light emitting unit, a first carriage, a first photoelectric conversion unit, a first lens, and a second carriage. The light emitting unit irradiates a reading object with light. The first carriage includes a first optical member for guiding reflected light from the reading object. The first carriage is movable in a sub-scanning direction along the reading object. The first photoelectric conversion unit receives the reflected light from the reading object guided through the first optical member and outputs an image signal. The first lens is disposed on an optical path of the reflected light between the first optical member and the first photoelectric conversion unit, and images the reflected light from the reading object on the first photoelectric conversion unit. The second carriage is movable in a main scanning direction orthogonal to the sub-scanning direction along the reading object with respect to the first carriage. The second carriage includes a second optical member for guiding reflected light from the reading object, a second photoelectric conversion unit that receives the reflected light from the reading object guided through the second optical member to output an image signal, and a second lens that is disposed on an optical path of the reflected light between the second optical member and the second photoelectric conversion unit and images the reflected light from the reading object on the second photoelectric conversion unit at a magnification different from the first lens.

An image reading apparatus 10 according to one embodiment is described with reference to drawings.

Figure 1:
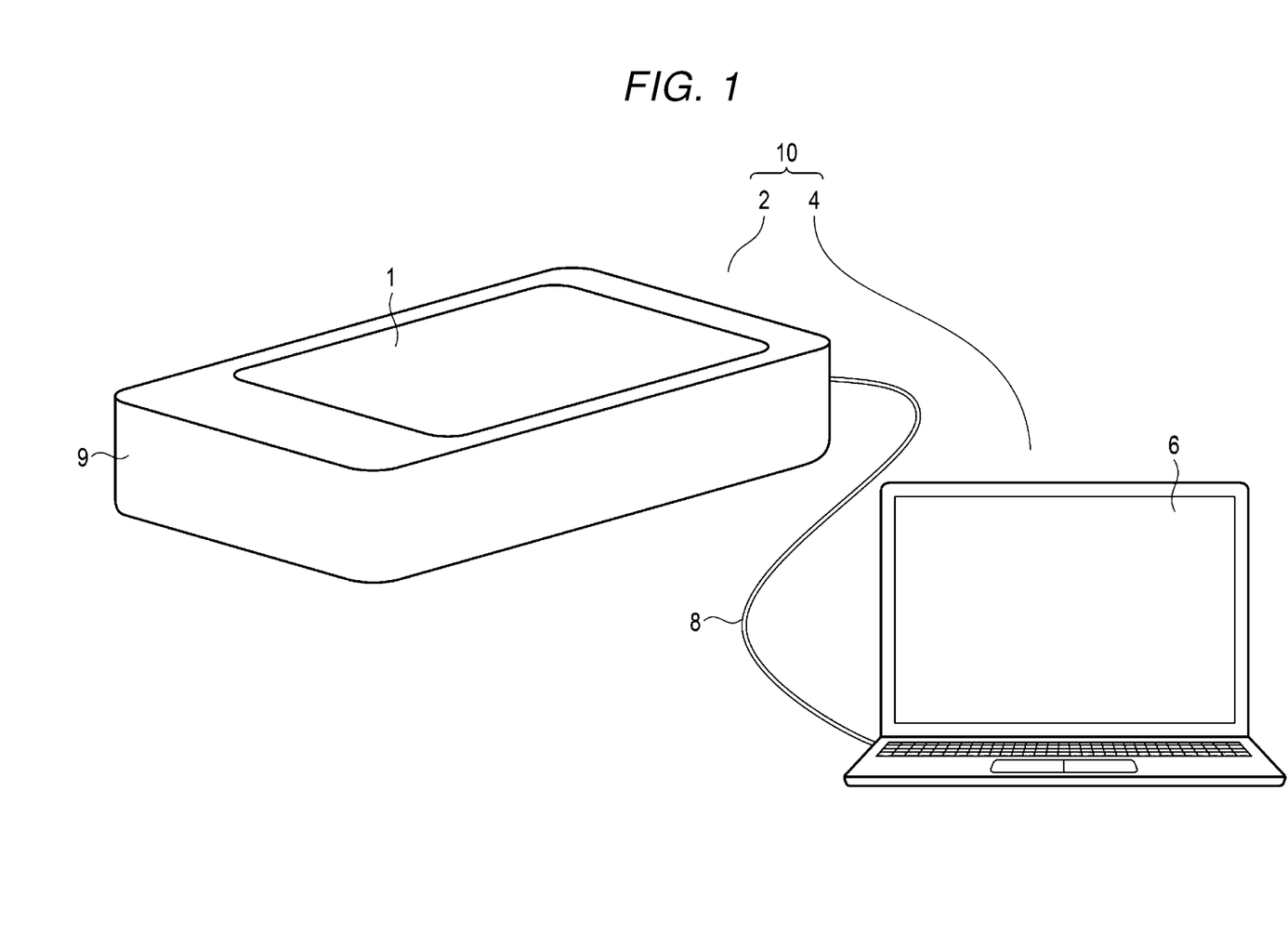
FIG. 1 is a schematic diagram of an image reading apparatus according to one embodiment.

As shown in FIG. 1, the image reading apparatus 10 includes a scanner 2 that reads an image of a reading object not shown here and a personal computer 4. The scanner 2 includes an approximately rectangular flat document glass 1 disposed horizontally for placing a reading object. The personal computer 4 includes a screen 6 (display unit) that displays the read image. The personal computer 4 is connected to the scanner 2 by a USB cable 8.

The scanner 2 includes a housing 9 in an approximately rectangular box shape. The housing 9 includes the document glass 1 on the upper surface thereof. The internal structure of the scanner 2 is described with reference to FIGS. 2 to 5.

Figure 2:
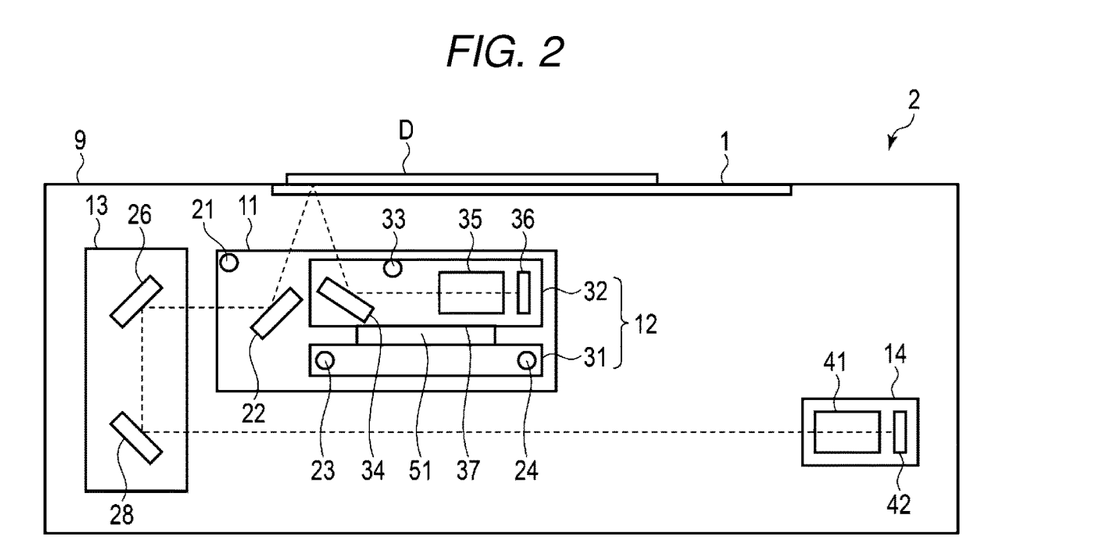
FIG. 2 is a schematic diagram showing the internal structure of a scanner in FIG. 1.
Figure 3:
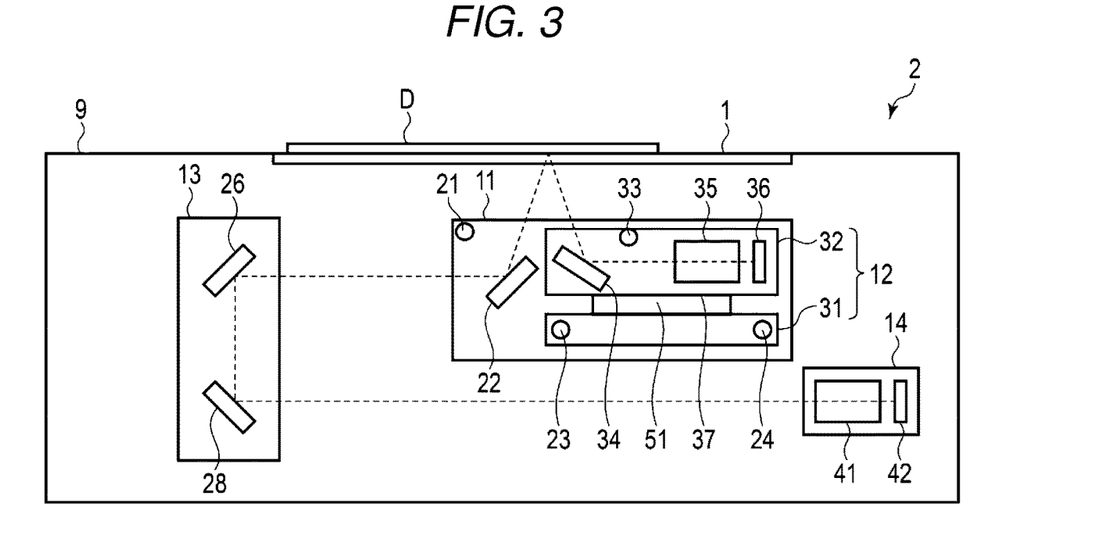
FIG. 3 is a schematic diagram showing a state in which a first carriage in FIG. 2 is moved in a sub-scanning direction.
Figure 4:
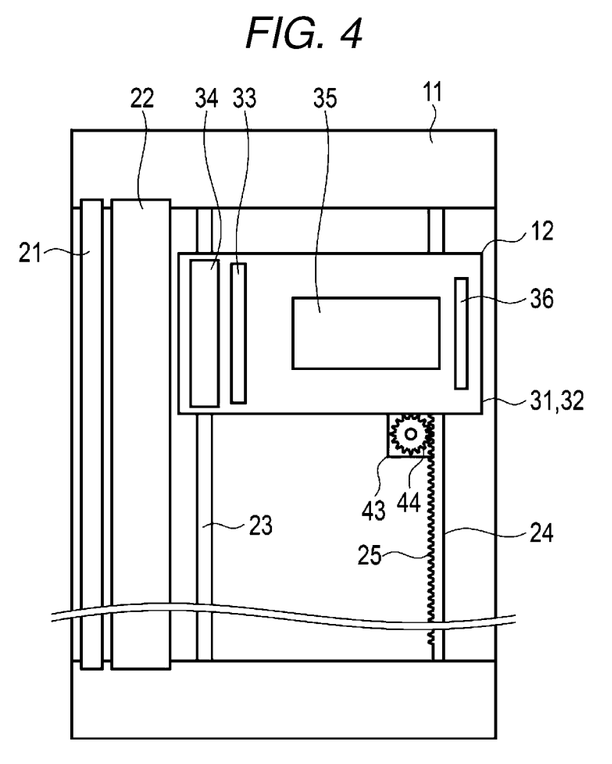
FIG. 4 is a plan diagram of the first carriage in FIG. 2 viewed from a document glass side.

As shown in FIGS. 2 to 4, the scanner 2 includes a first carriage 11 disposed in the housing 9 on the lower side of the document glass 1. The scanner 2 includes the first carriage 11 in a posture where the longitudinal direction thereof is along the main scanning direction parallel to the document glass 1. The main scanning direction is a direction orthogonal to a paper surface in FIGS. 2 and 3. The first carriage 11 is movable along the document glass 1 in the sub-scanning direction parallel to the document glass 1. The sub-scanning direction is the left and right direction in FIGS. 2 and 3.

The first carriage 11 is mounted with the second carriage 12 in a state where the second carriage 12 faces the document glass 1. The first carriage 11 includes the second carriage 12 in a posture where the longitudinal direction thereof is along the main scanning direction parallel to the document glass 1. The second carriage 12 is movable in the main scanning direction (up and down direction in FIG. 4) parallel to the document glass 1 and orthogonal to the moving direction of the first carriage 11 with respect to the first carriage 11.

The scanner 2 includes a mirror unit 13 on one side (left side in FIGS. 2 and 3) of the first carriage 11 in the sub-scanning direction. The mirror unit 13 is interlocked with the first carriage 11 so as to be movable in the sub-scanning direction. The mirror unit 13 includes two mirrors 26 and 28 that guide the reflected light from the reading object.

The scanner 2 includes a first lens unit 14 fixed to the housing 9. The first lens unit 14 includes a first lens 41 and a first photoelectric conversion unit 42. The first photoelectric conversion unit 42 is formed by arranging a plurality of imaging elements such as a charge coupled device (CCD) and a complementary metal oxide semiconductor (CMOS) on a substrate. The first lens 41 forms reflected light from the reading object on the first photoelectric conversion unit 42.

The first carriage 11 includes a lamp 21 that emits illumination light to be radiated on a document D as an example of the reading object placed on the upper surface of the document glass 1. The lamp 21 functions as a light emitting unit or a first light emitting unit. As shown in FIG. 4, the lamp 21 is long in the main scanning direction and can irradiate the full width of the image readable region of the document glass 1 in the main scanning direction with illumination light. The image readable region of the document glass 1 is a rectangular region slightly smaller than the document glass 1.

The first carriage 11 includes a mirror 22 (first optical member) reflecting reflected light from the document D toward the mirror 26 of the mirror unit 13. The mirror 22 is long in the main scanning direction and can reflect the reflected light from the document D guided through the full width of the image reading region of the document glass 1 in the main scanning direction.

The second carriage 12 has a shorter width in the main scanning direction than the first carriage 11 as shown in FIG. 4. The first carriage 11 includes two slide rails 23 and 24 long in the main scanning direction. The second carriage 12 includes a slide base 31 (moving member) slidably attached to the two slide rails 23 and 24 of the first carriage 11. The second carriage 12 includes a second lens unit 32 rotatably attached to the slide base 31 around a spindle 30 (FIG. 5) orthogonal to the main scanning direction and the sub-scanning direction. The second carriage 12 includes the second lens unit 32 on the document glass 1 side of the slide base 31.

The second lens unit 32 includes a lamp 33 that emits illumination light to be radiated on the document D placed on the upper surface of the document glass 1. The lamp 33 functions as a light emitting unit or a second light emitting unit. The lamp 33 is shorter in length in the main scanning direction than the lamp 21 provided in the first carriage 11, and shorter in width of illumination light radiated on the document D in the main scanning direction than the lamp 21. The second carriage 12 further includes a mirror 34 (second optical member), a second lens 35, and a second photoelectric conversion unit 36. The mirror 34 reflects the reflected light from the document D toward the second photoelectric conversion unit 36. The second lens 35 and the second photoelectric conversion unit 36 function in the same manner as the first lens 41 and the first photoelectric conversion unit 42, respectively.

As shown in FIG. 4, the slide base 31 of the second carriage 12 includes a motor 43 for moving the second carriage 12 in the main scanning direction with respect to the first carriage 11. The motor 43 includes a pinion 44 on the rotary shaft thereof. The rotary shaft of the motor 43 extends in the up and down direction perpendicular to the main scanning direction and the sub-scanning direction. One slide rail 24 of the first carriage 11 includes a rack 25 engaged with the pinion 44. If the motor 43 is rotated, the pinion 44 rotates, the slide base 31 moves in the main scanning direction along the slide rail 24 including the rack 25, and the second carriage 12 moves in the main scanning direction with respect to the first carriage 11. The motor 43, the pinion 44, the slide rail 24, and the rack 25 function as a moving mechanism for moving the second carriage 12 in the main scanning direction with respect to the first carriage 11.

Figure 5:
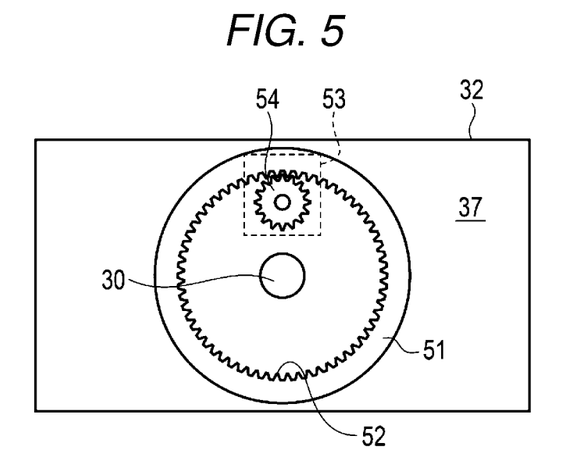
FIG. 5 is a bottom diagram of a second lens unit of a second carriage in FIG. 4 viewed from a slide base side.

As shown in FIG. 5, the second lens unit 32 of the second carriage 12 includes an annular inner gear 51 fixed to a lower surface 37 opposed to the slide base 31. The inner gear 51 is coaxial with the spindle 30 around which the second lens unit 32 is rotatably attached with respect to the slide base 31, and includes a plurality of teeth 52 continuous on the whole circumference inside. The slide base 31 includes a motor 53. The motor 53 includes a gear 54 engaged with the internal gear 51 of the second lens unit 32 on the rotary shaft thereof. In FIG. 5, the slide base 31 is not illustrated, and the motor 53 fixed to the slide base 31 is shown by a dashed line. The gear 54 attached to the rotary shaft of the motor 53 is shown by a solid line in order to make the description easy to understand.

If the motor 53 attached to the slide base 31 is rotated, the inner gear 51 of the second lens unit 32 engaged with the gear 54 rotates around the spindle 30, and the second lens unit 32 rotates around the spindle 30 with respect to the slide base 31. The internal gear 51, the motor 53, and the gear 54 function as a rotating mechanism for rotating the second lens unit 32 around the spindle 30 with respect to the slide base 31.

As described above, the second lens unit 32 of the second carriage 12 can move in the sub-scanning direction by the movement of the first carriage 11, can move in the main scanning direction with respect to the first carriage 11 by rotating the motor 43, and can rotate around the spindle 30 with respect to the slide base 31 by rotating the motor 53.

The operation of the image reading apparatus 10 is described below.

If the image of the document D is read at a normal resolution, the lamp 21 of the first carriage 11 is turned on to apply illumination light to the document D, and the mirror unit 13 and the first carriage 11 are moved in the sub-scanning direction. Reflected light from the document D is guided through the mirror 22 of the first carriage 11, the two mirrors 26 and 28 of the mirror unit 13, and the first lens 41 of the first lens unit 14, and is imaged on the first photoelectric conversion unit 42. The first photoelectric conversion unit 42 photoelectrically converts the received reflected light to output an image signal.

If the image of the document D is read at a higher resolution than usual, the second carriage 12 is disposed on one side of the first carriage 11 in the main scanning direction, the lamp 33 of the second carriage 12 is turned on to apply illumination light to the document D, and the mirror unit 13 and the first carriage 11 are moved in the sub-scanning direction. The reflected light from the document D is guided through the mirror 34 and the second lens 35 of the second lens unit 32, and is imaged on the second photoelectric conversion unit 36. The second photoelectric conversion unit 36 photoelectrically converts the received reflected light to output an image signal. The second photoelectric conversion unit 36 can read an image having a resolution higher than the first photoelectric conversion unit 42.

Figure 6:
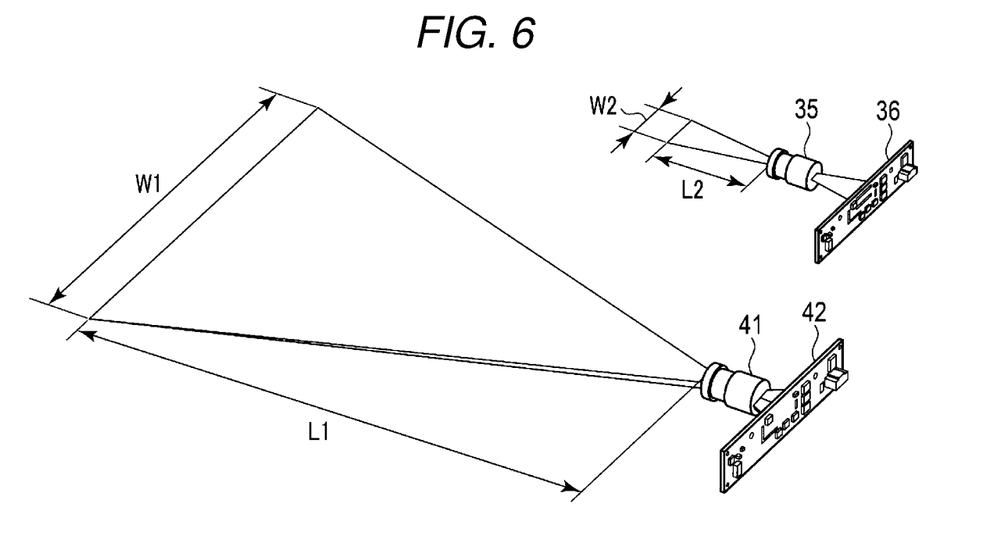
FIG. 6 is a schematic diagram showing a comparison of a reading area of a reading object in a main scanning direction by a first photoelectric conversion unit in FIG. 2 and a reading area of the reading object in the main scanning direction by a second photoelectric conversion unit.

The lamp 21 of the first carriage 11 applies illumination light to the document D with a length covering the full width of the image readable region of the document glass 1 in the main scanning direction. As shown below FIG. 6, the width of the reflected light from the document D in the main scanning direction becomes a full width W1 of the image readable region of the document glass 1 at the longest length in the main scanning direction. The optical path length between the document D and the first lens 41 becomes L1. The first lens 41 can image the reflected light from the document D passing the full width of the image readable region of the document glass 1 in the main scanning direction on the first photoelectric conversion unit 42. Therefore, if the image of the document D is read at a normal resolution, the image on the whole surface of the document D can be read by scanning the document D in the sub-scanning direction only once.

On the other hand, the lamp 33 of the second carriage 12 applies illumination light to the document D with a length covering a part of the full width of the image readable region of the document glass 1 in the main scanning direction. As shown in the upper part of FIG. 6, the width of the reflected light from the document D in the main scanning direction becomes a partial width W2 of the full width W1 of the image readable region of the document glass 1 in the main scanning direction. The optical path length between the document D and the second lens 35 becomes L2 shorter than L1. The second lens 35 can image the reflected light from the document D passing a part of the full width of the image readable region of the document glass 1 in the main scanning direction on the second photoelectric conversion unit 36. Therefore, if the image of the document D is read at a higher resolution than usual, the image of the full width of the document D in the main scanning direction cannot be read by scanning the document D in the sub-scanning direction only once.

Figure 7:
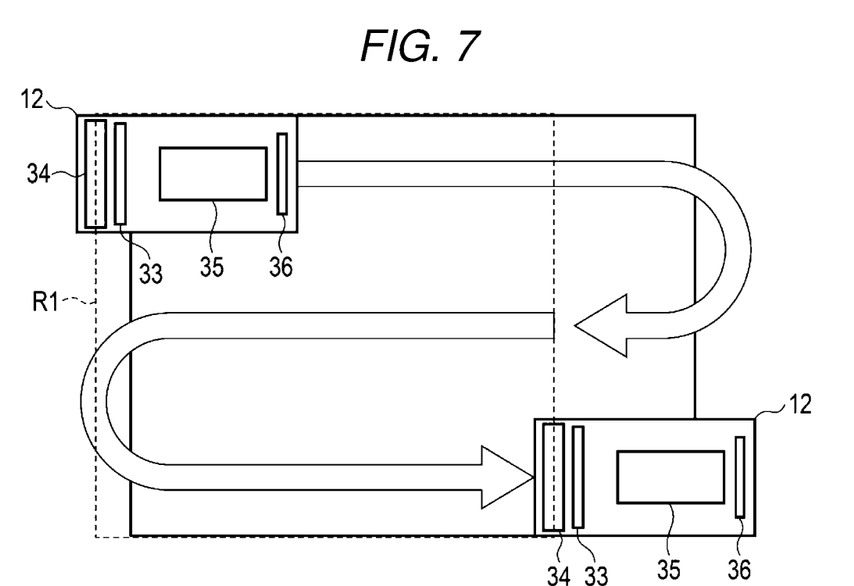
FIG. 7 is a schematic diagram illustrating the movement of the second carriage if an image is read at a higher resolution than usual by the scanner in FIG. 2.

In the case of reading the image of the full width of the document D in the main scanning direction at a higher resolution than usual, as shown in FIG. 7, the document D is scanned in the sub-scanning direction in a state where the second carriage 12 is disposed on one side in the main scanning direction, the second carriage 12 is moved to an adjacent region toward the other side in the main scanning direction with respect to the first carriage 11, and the region of the document D adjacent in the main scanning direction is scanned in the sub-scanning direction. By repeating this at the full width of the document D in the main scanning direction, the image of the full width of the document D in the main scanning direction can be read at high resolution.

Figure 8:
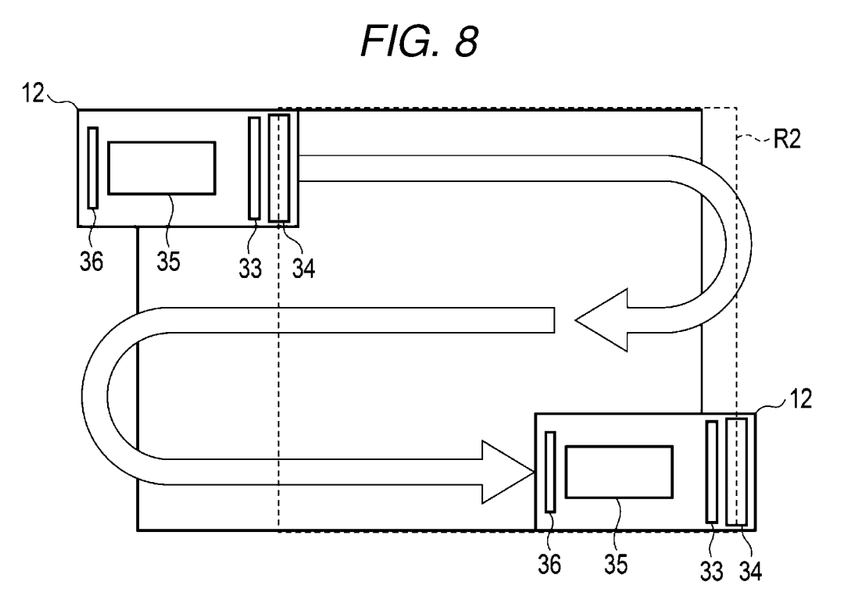
FIG. 8 is a schematic diagram illustrating the movement of the second carriage if an image is read in a state where the second lens unit of the second carriage in FIG. 7 is inverted by 180°.

As shown in FIG. 8, in a state where the second carriage 12 is rotated by 180° around the spindle 30, the second carriage 12 is moved back and forth in the sub-scanning direction a plurality of times to read the document D, thereby expanding the readable region in the sub-scanning direction. That is, while the region in which the image can be read in the state where the second carriage 12 is disposed in the direction shown in FIG. 7 is a region R1 surrounded by a dashed line, the region in which the image can be read in a state where the second carriage 12 is inverted by 180° in the direction shown in FIG. 8 becomes a region R2 surrounded by a dashed line. Therefore, if the image data read before the second carriage 12 is inverted is combined with the image data read after the second carriage 12 is inverted, the image reading region in the sub-scanning direction can be expanded.

As described above, the image reading apparatus 10 of the present embodiment includes an optical system having a normal magnification for reading the image of the reading object at a normal resolution, and an optical system having a high magnification for reading the image of the reading object at a higher resolution than usual. Therefore, in the case of reading the image at a normal resolution and reading the image at a higher resolution than usual, it is not necessary to replace the optical member such as a photoelectric conversion unit, thereby enhancing the convenience.

According to the present embodiment, the reading of the image at a normal resolution and the reading of the image at a higher resolution than usual can be simultaneously performed. Specifically, since the scanner 2 in the present embodiment includes the second photoelectric conversion unit 36 having a higher resolution than that of the first photoelectric conversion unit 42, if the first carriage 11 is moved in the sub-scanning direction if the image is read at a normal resolution, the image of a part of the region in the main scanning direction can be read at a higher resolution than usual. Therefore, when reading images with different resolutions, the time required for reading the images can be shortened compared with the case of reading the images separately.

If the image is read at a normal resolution, the image is displayed on the screen 6 of the personal computer 4, and the region of the image in the middle of reading at a higher resolution than usual can be displayed by a frame. Thus, it is possible to know which region of the image region is read at a high resolution in the image of the whole reading object, thereby improving the convenience. For example, in the case of reading cells in a flask at a high resolution, it is easy to determine where in the entire bottom of the flask cells are read.

Alternatively, the image based on the image signal output from the first photoelectric conversion unit 42 and the image based on the image signal output from the second photoelectric conversion unit can be displayed side by side on the screen 6 at the same time. In this case, after the image read at the normal resolution is displayed, the image read at a higher resolution than usual can be displayed slightly later.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the embodiment described above, a rack and pinion is used as a mechanism for moving the second carriage 12 in the main scanning direction with respect to the first carriage 11, but a gear attached to the rotary shaft of a motor provided in the second carriage 12 may be engaged with a toothed belt on the first carriage 11 side to move the second carriage 12 in the main scanning direction. Alternatively, a ball screw or the like may be used as the moving mechanism of the second carriage 12.

What is claimed is:
1. An image reading apparatus, comprising:
a light emitting component configured to irradiate a reading object with light;
a first carriage including a first optical member for guiding reflected light from the reading object and provided movably in a sub-scanning direction along the reading object;
a first photoelectric conversion component configured to receive the reflected light from the reading object guided through the first optical member to output an image signal;
a first lens disposed on an optical path of the reflected light between the first optical member and the first photoelectric conversion component and configured to image the reflected light from the reading object on the first photoelectric conversion component; and
a second carriage including a second optical member provided movably in a main scanning direction orthogonal to the sub-scanning direction along the reading object with respect to the first carriage and guiding the reflected light from the reading object, a second photoelectric conversion component that receives the reflected light from the reading object guided through the second optical member to output an image signal, and a second lens disposed on an optical path of the reflected light between the second optical member and the second photoelectric conversion component and images the reflected light from the reading object on the second photoelectric conversion component at a magnification different from the first lens.

2. The image reading apparatus according to claim 1, wherein
the light emitting component includes a first light emitting component provided on the first carriage and a second light emitting unit provided on the second carriage.

3. The image reading apparatus according to claim 2, wherein
the second light emitting component has a shorter length in the main scanning direction than the first light emitting component.

4. The image reading apparatus according to claim 1, wherein
the second carriage includes a moving member provided movably in the main scanning direction with respect to the first carriage.

5. The image reading apparatus according to claim 4, further comprising:
a moving mechanism configured to move the moving member in the main scanning direction with respect to the first carriage.

6. The image reading apparatus according to claim 5, wherein
in addition to the moving member, the second carriage includes the second optical member, the second photoelectric conversion component, and a second lens component to which the second lens is fixed.

7. The image reading apparatus according to claim 6, wherein
the second lens component is rotatably attached to the moving member around a spindle orthogonal to the main scanning direction and the sub-scanning direction.

8. The image reading apparatus according to claim 7, further comprising:
a rotating mechanism configured to rotate the second lens component around the spindle with respect to the moving member.

9. The image reading apparatus according to claim 1, further comprising:
a mirror component including a mirror for reflecting the reflected light from the reading object guided through the first optical member toward the first photoelectric conversion component and configured to be interlocked with the first carriage to move in the sub-scanning direction.

10. The image reading apparatus according to claim 1, further comprising:
a display component configured to simultaneously display an image based on the image signal output from the first photoelectric conversion component and an image based on the image signal output from the second photoelectric conversion component.

11. The image reading apparatus according to claim 1, wherein
an optical path length between the reading object and the second lens is shorter than an optical path length between the reading object and the first lens.

12. An image reading method, comprising:
irradiating a reading object with light from a light emitting component;
guiding reflected light from the reading object by a first carriage including a first optical member provided movably in a sub-scanning direction along the reading object;
receiving the reflected light from the reading object guided through the first optical member to output an image signal by a first photoelectric conversion component;
imaging the reflected light from the reading object on the first photoelectric conversion component by a first lens disposed on an optical path of the reflected light between the first optical member and the first photoelectric conversion component;
guiding the reflected light from the reading object by a second optical member provided movably in a main scanning direction orthogonal to the sub-scanning direction in a second carriage along the reading object with respect to the first carriage;
receiving the reflected light from the reading object guided through the second optical member to output an image signal by a second photoelectric conversion component; and
imaging the reflected light from the reading object on the second photoelectric conversion component at a magnification different from the first lens by a second lens disposed on an optical path of the reflected light between the second optical member and the second photoelectric conversion component.

13. The image reading method according to claim 12, further comprising:
moving a moving member in the main scanning direction with respect to the first carriage.

14. The image reading method according to claim 13, further comprising:
a rotating mechanism configured to rotating the second lens component around a spindle with respect to the moving member.

15. The image reading method according to claim 12, further comprising:
reflecting the reflected light from the reading object guided through the first optical member toward the first photoelectric conversion component.

16. The image reading method according to claim 12, further comprising:
simultaneously displaying an image based on the image signal output from the first photoelectric conversion component and an image based on the image signal output from the second photoelectric conversion component.

17. The high resolution image reading apparatus according to claim 12, wherein
an optical path length between the reading object and the second lens is shorter than an optical path length between the reading object and the first lens.

18. A high resolution image reading apparatus, comprising:
a light emitting component configured to irradiate a reading object with light;
a first carriage including a first optical member for guiding reflected light from the reading object and provided movably in a sub-scanning direction along the reading object;
a first photoelectric conversion component configured to receive the reflected light from the reading object guided through the first optical member to output an image signal;
a first lens disposed on an optical path of the reflected light between the first optical member and the first photoelectric conversion component and configured to image the reflected light from the reading object on the first photoelectric conversion component; and a second carriage including a second optical member provided movably in a main scanning direction orthogonal to the sub-scanning direction along the reading object with respect to the first carriage and guiding the reflected light from the reading object, a second photoelectric conversion component that receives the reflected light from the reading object guided through the second optical member to output an image signal, and a second lens disposed on an optical path of the reflected light between the second optical member and the second photoelectric conversion component and images the reflected light from the reading object on the second photoelectric conversion component at a magnification greater than the first lens.

19. The high resolution image reading apparatus according to claim 18, wherein
the light emitting component includes a first light emitting component provided on the first carriage and a second light emitting unit provided on the second carriage.

20. The high resolution image reading apparatus according to claim 19, wherein
the second light emitting component has a shorter length in the main scanning direction than the first light emitting component.

* * * * *